(12) United States Patent
Caverly et al.

(10) Patent No.: US 12,227,224 B2
(45) Date of Patent: Feb. 18, 2025

(54) EXTERNALLY TRANSLATING, INTERNALLY TELESCOPING STEERING COLUMN ASSEMBLY

(71) Applicant: Steering Solutions IP Holding Corporation, Saginaw, MI (US)

(72) Inventors: Jacob A. Caverly, Freeland, MI (US); Randy W. Jones, North Branch, MI (US); Scott A. Stinebring, Auburn, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 0 days.

(21) Appl. No.: 18/400,148

(22) Filed: Dec. 29, 2023

(65) Prior Publication Data

US 2024/0132137 A1 Apr. 25, 2024

Related U.S. Application Data

(63) Continuation of application No. 18/084,942, filed on Dec. 20, 2022, now Pat. No. 11,891,113.

(60) Provisional application No. 63/331,922, filed on Apr. 18, 2022.

(51) Int. Cl.
*B62D 1/185* (2006.01)
*B62D 1/181* (2006.01)
*B62D 5/00* (2006.01)

(52) U.S. Cl.
CPC .............. *B62D 1/185* (2013.01); *B62D 1/181* (2013.01); *B62D 5/006* (2013.01)

(58) Field of Classification Search
CPC .......... B62D 1/185; B62D 1/181; B62D 5/006
See application file for complete search history.

(56) References Cited

U.S. PATENT DOCUMENTS

| 2008/0156138 A1* | 7/2008 | Tomaru | B62D 1/181 |
| | | | 74/493 |
| 2020/0156692 A1* | 5/2020 | Sherwood | B62D 1/189 |

FOREIGN PATENT DOCUMENTS

| DE | 102012009748 A1 * | 11/2013 | ............. B62D 1/185 |
| JP | 2013079051 A * | 5/2013 | ............. B62D 1/184 |
| KR | 102093228 B1 * | 3/2020 | |
| KR | 20200070086 A * | 6/2020 | |
| WO | WO-2011001888 A1 * | 1/2011 | ............. B62D 1/185 |
| WO | WO-2015124944 A1 * | 8/2015 | ............. B62D 1/184 |

(Continued)

*Primary Examiner* — Drew J Brown
(74) *Attorney, Agent, or Firm* — Dickinson Wright PLLC

(57) ABSTRACT

An axially adjustable steering column assembly includes an upper jacket. And a lower jacket. The steering column assembly further includes a column mounting bracket, wherein the lower jacket is operatively coupled to the column mounting bracket and translates relative to the column mounting bracket, wherein the column mounting bracket defines a first set of tapered rail slots, each of the first set of tapered rail slots disposed on opposite sides of the column mounting bracket and extending longitudinally along the column mounting bracket, wherein the lower jacket defines a second set of tapered rail slots, each of the second set of tapered rail slots disposed on opposite sides of the lower jacket and extending longitudinally along the lower jacket. The steering column assembly yet further includes a first pair of sliding wedge bushings disposed within the first set of tapered rail slots.

11 Claims, 4 Drawing Sheets

(56) References Cited

FOREIGN PATENT DOCUMENTS

| WO | WO-2020240277 A1 | * | 11/2020 | ............. | B62D 1/185 |
| WO | WO-2021224200 A1 | * | 11/2021 | ............. | B62D 1/181 |

* cited by examiner

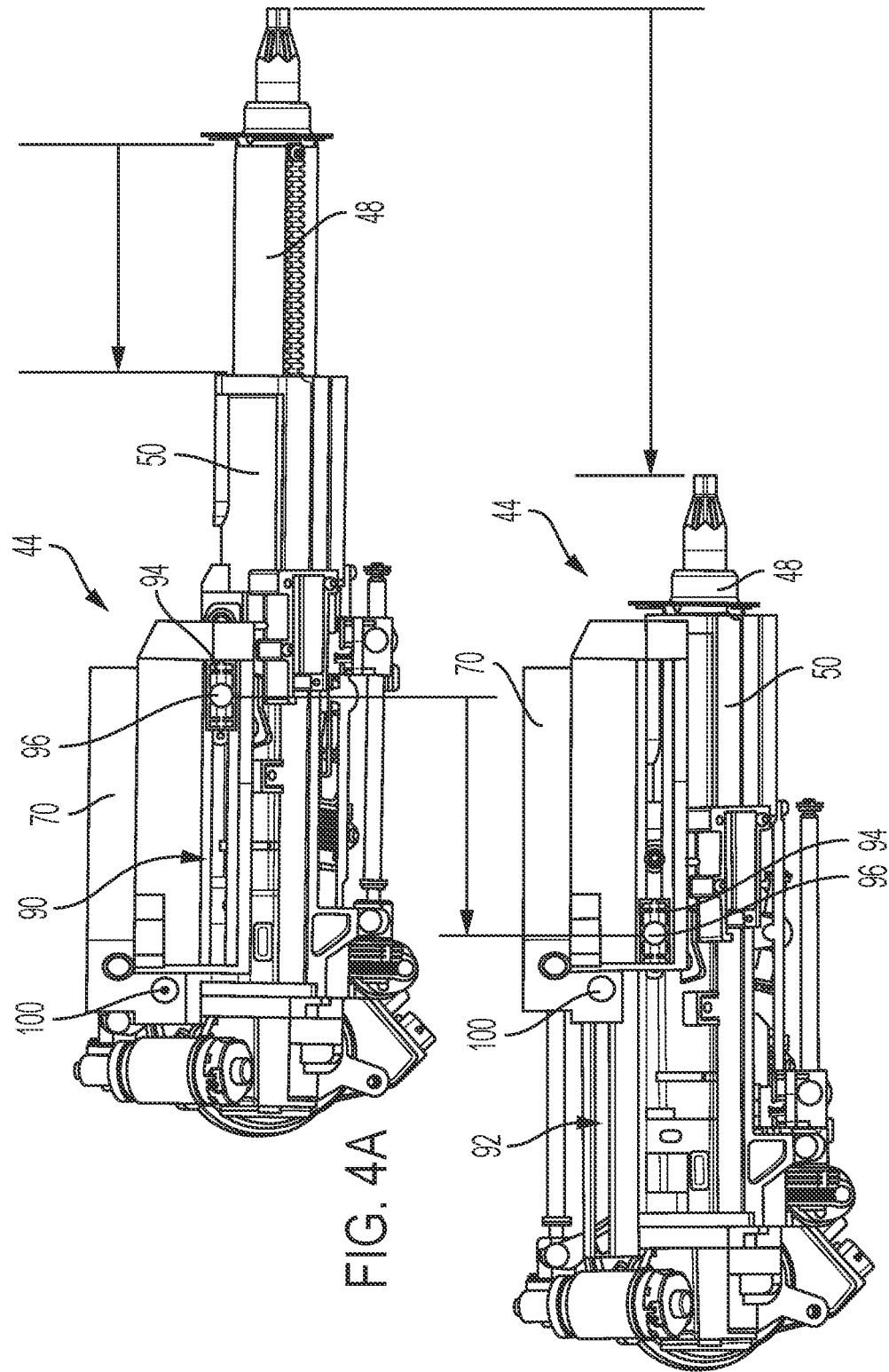

EXTERNALLY TRANSLATING, INTERNALLY TELESCOPING STEERING COLUMN ASSEMBLY

CROSS-REFERENCE TO RELATED APPLICATION

This application claims the benefits of priority to U.S. patent application Ser. No. 18/084,942, filed Dec. 20, 2022, which claims priority to U.S. Provisional Patent Application Ser. No. 63/331,922, filed Apr. 18, 2022, the disclosures of which are incorporated by reference herein in their entireties.

FIELD OF THE INVENTION

The embodiments described herein relate to vehicle steering systems and, more particularly, to a steering column assembly that is externally translating and internally telescoping.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle.

Some steering columns are axially adjustable between positions. In the past, a function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned further away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode.

Steering column assemblies that are moved significantly to a stowed position may be very long. The significant length of a steering column presents packaging challenges that impose challenges on packaging a traditional internally stowing column (i.e., jacket-in-jacket or triple jacket). Due to the required length of the column—and the associated long stow length requirement—the handwheel feedback actuator resides in a critical area needed for vehicle energy absorption during a barrier event. Addressing the above-described packaging challenges would be well received in the industry for steering columns that require full stow capability.

SUMMARY

According to one aspect of the disclosure, an axially adjustable steering column assembly includes an upper jacket. The steering column assembly also includes a lower jacket, wherein the upper jacket is received within the lower jacket and is telescopingly adjustable therein. The steering column assembly further includes a column mounting bracket, wherein the lower jacket is operatively coupled to the column mounting bracket and translates relative to the column mounting bracket, wherein the column mounting bracket defines a first set of tapered rail slots, each of the first set of tapered rail slots disposed on opposite sides of the column mounting bracket and extending longitudinally along the column mounting bracket, wherein the lower jacket defines a second set of tapered rail slots, each of the second set of tapered rail slots disposed on opposite sides of the lower jacket and extending longitudinally along the lower jacket. The steering column assembly yet further includes a first pair of sliding wedge bushings, wherein each of the first pair of sliding wedge bushings is disposed within a respective one of the first set of tapered rail slots. The steering column assembly also includes a pair of first bolts, wherein the pair of first bolts extends through the first pair of sliding wedge bushings and operatively couples the first pair of sliding wedge bushings to the column mounting bracket. The steering column assembly further includes a first actuator operatively coupled to the upper jacket to control telescoping adjustment of the upper jacket relative to the lower jacket. The steering column assembly yet further includes a second actuator operatively coupled to the lower jacket to control translating adjustment of the lower jacket relative to the column mounting bracket.

According to another aspect of the disclosure, an axially adjustable steering column assembly includes an upper jacket. The steering column assembly also includes a lower jacket, wherein the upper jacket is received within the lower jacket and is telescopingly adjustable therein. The steering column assembly further includes a column mounting bracket, wherein the lower jacket is operatively coupled to the column mounting bracket and translates relative to the column mounting bracket, wherein the column mounting bracket defines a first set of tapered rail slots, each of the first set of tapered rail slots disposed on opposite sides of the column mounting bracket and extending longitudinally along the column mounting bracket, wherein the lower jacket defines a second set of tapered rail slots, each of the second set of tapered rail slots disposed on opposite sides of the lower jacket and extending longitudinally along the lower jacket. The steering column assembly yet further includes a first pair of sliding wedge bushings, wherein each of the first pair of sliding wedge bushings is disposed within a respective one of the first pair of tapered rail slots. The steering column assembly also includes a pair of first bolts, wherein the pair of first bolts extends through the first pair of sliding wedge bushings and operatively couples the first pair of sliding wedge bushings to the column mounting bracket. The steering column assembly also includes a second pair of sliding wedge bushings, wherein each of the second pair of sliding wedge bushings is disposed within a respective one of the second pair of tapered rail slots. The steering column assembly further includes a pair of second bolts, wherein the pair of second bolt extends through the second pair of sliding wedge bushings and operatively couples the second pair of sliding wedge bushings to the lower jacket. The steering column assembly yet further includes a first actuator operatively coupled to the upper jacket to control telescoping adjustment of the upper jacket relative to the lower jacket. The steering column assembly also includes a second actuator operatively coupled to the lower jacket to control translating adjustment of the lower jacket relative to the column mounting bracket. The steering column assembly further includes a handwheel feedback actuator housing operatively coupled to the lower jacket, wherein the handwheel feedback actuator housing translates with the lower jacket relative to the column mounting bracket.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 4A and 4B are side, elevational views of the steering column assembly in various axial positions.

DETAILED DESCRIPTION

Figure 1:
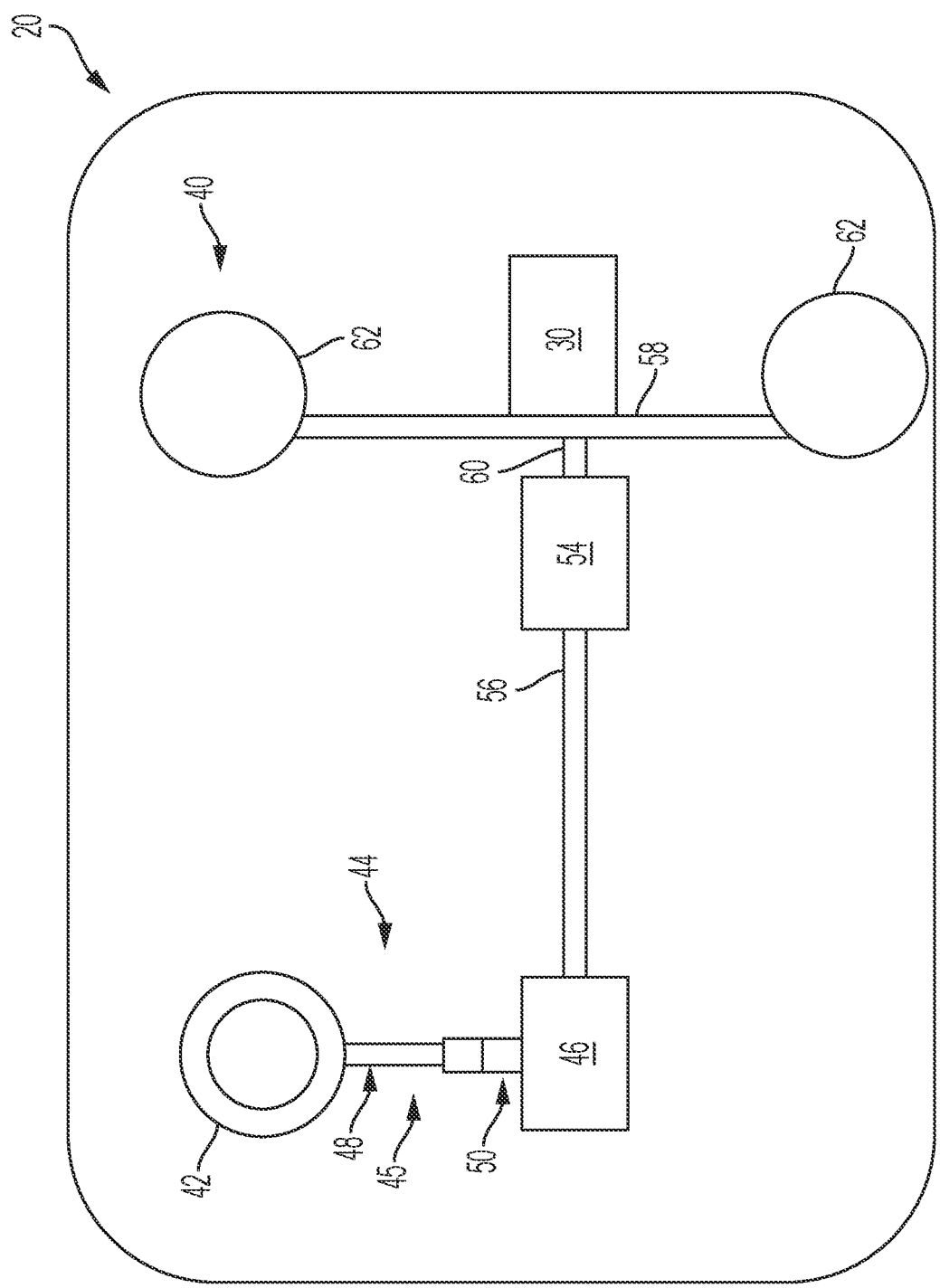
FIG. 1 schematically illustrates a vehicle steering system.

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions. In the past, a function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned completely away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode.

Referring now to the drawings, where the various embodiments are shown and described herein without limiting same, FIGS. 1-4B illustrate embodiments of a steering column assembly that is axially adjustable with improved packaging and other operational benefits. The axial adjustability results from relative movement between two steering column portions (e.g. jackets, brackets, rails, and/or the like) which permit axial movement therebetween. In the disclosure, the term "jacket" is used to represent any form of column portions. In particular, an upper jacket and a lower jacket will be referenced and is illustrated in the drawings. The specific terminology is not limiting of the particular type of steering column portions contemplated within the scope of the disclosure.

In some embodiments, the relative movement between the column portions work in combination with relative movement between multiple steering shaft portions that permit axial movement therebetween. Axial movement refers to movement resulting from relative telescopic, sliding, and/or translational movement between components in a longitudinal direction of the overall steering column assembly.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 includes a steering column 45 that extends along an axis from the input device 42 to an output assembly 46. The output assembly 46 is part of a steer-by-wire and/or autonomous driving system. The output assembly 46 may be referred to as an emulator and is used to provide feedback to the steering input device 42 and to receive manual driver inputs for steering control.

The steering column 45 includes two axially adjustable portions, for example, an upper jacket 48 and a lower jacket 50 that are axially adjustable with respect to one another.

The steering column 45 is moveable between a range of positions from a fully extended position to a fully retracted position. In the fully extended position, the upper jacket 48 is moved axially with respect to the lower jacket 50 so that the input device 42 is located near an operator of the vehicle. In the retracted position, the upper jacket 48 is moved axially with respect to the lower jacket 50 so that the input device 42 is located further away from an operator of the vehicle, when compared to the extended position. In some embodiments, the retracted position may correspond to stowing the input device 42. For example, it may be beneficial to place the input device 42 in a stowed location during autonomous driving. In operation, axial movement between the upper jacket 48 and the lower jacket 50 is effectuated electromechanically by one or more actuators. This axial movement adjusts between the extended position, the retracted position, and any intermediary positions. As described in detail below, the steering column is moveable in an axial direction over a first range of positions and over a second range of positions.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear and/or various traditional components. The output shaft 60 is operably connected to the steering gear assembly 54 such that a rotation of the steering gear input shaft 56 causes a responsive movement of the output shaft 60 and causes the drive axle to turn wheels 62.

Figure 2:
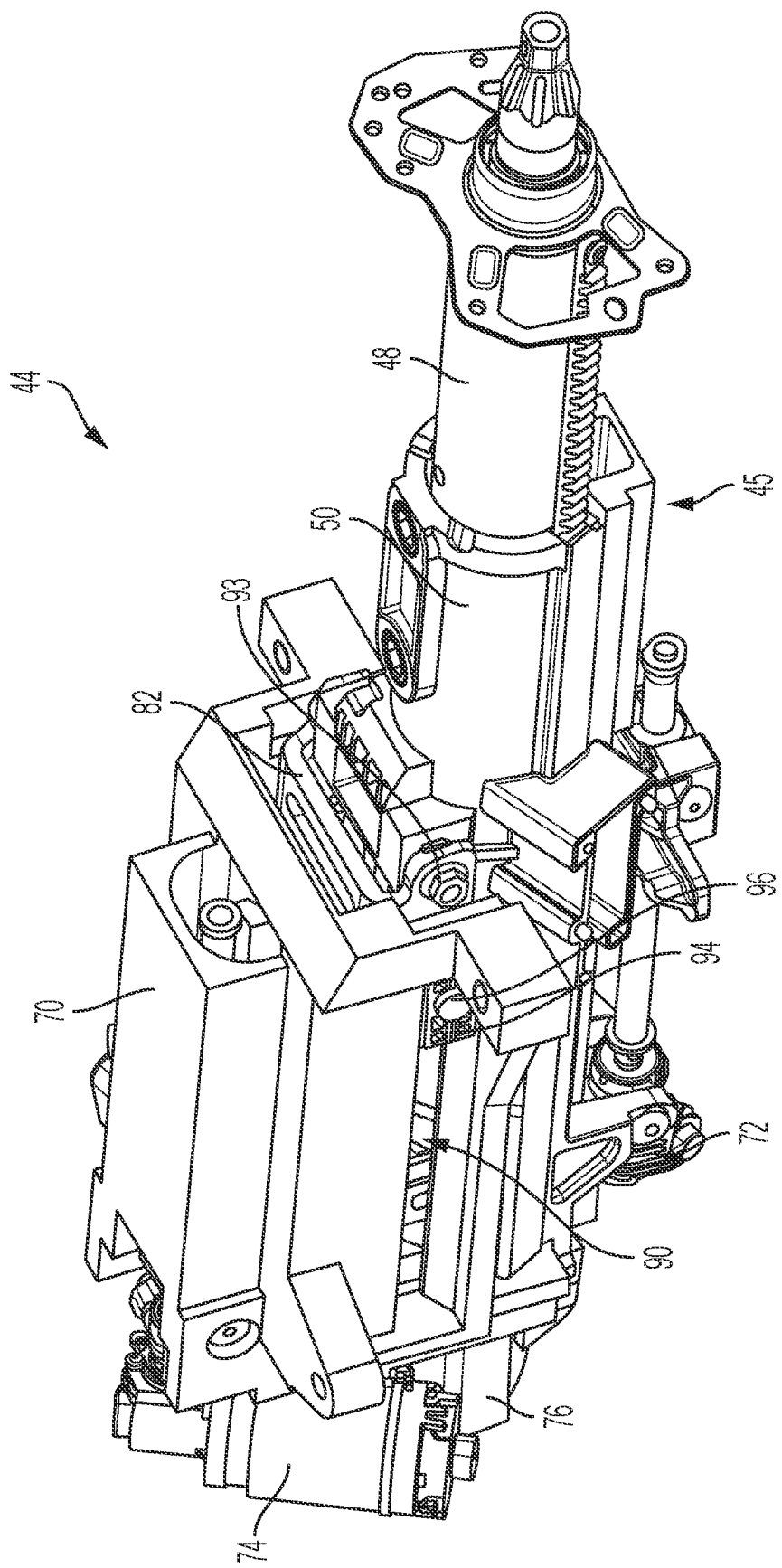
FIG. 2 is a perspective view of a steering column assembly for the vehicle steering system.
Figure 3:
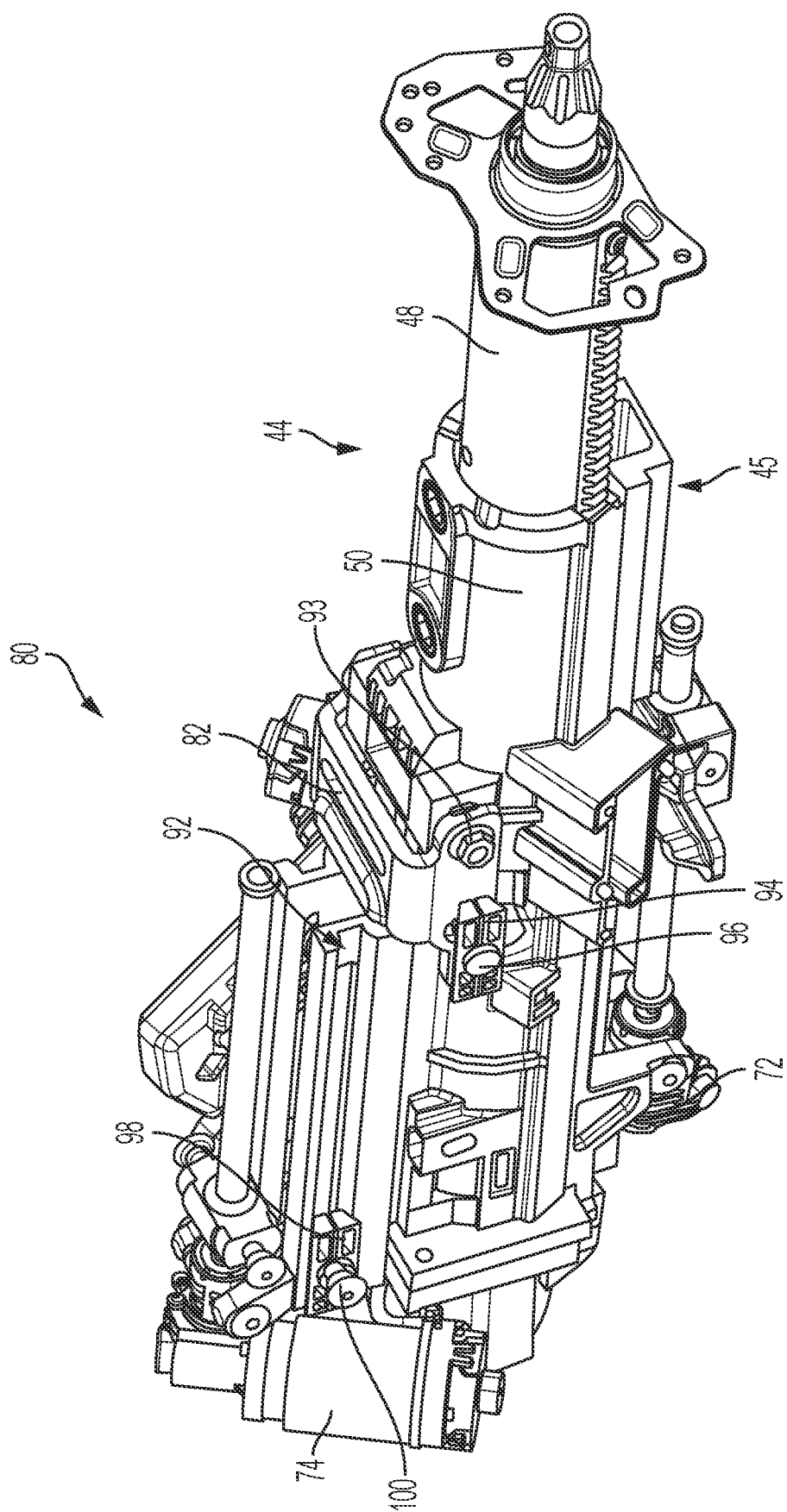
FIG. 3 is a perspective view of the steering column assembly with a column mounting bracket removed.

With reference now to FIGS. 2 and 3, the steering column assembly 44 is illustrated in greater detail. The upper jacket 48 is shown protruding from the lower jacket 50. The lower jacket 48 is operatively coupled to, and axially translatable relative to, a column mounting bracket 70. The column mounting bracket 70 is fixed relative to a vehicle structure to mount the steering column assembly 44 to the vehicle. The emulator 46 is at least partially positioned within a handwheel feedback actuator housing 76. The handwheel feedback actuator housing 76 is operatively coupled to the lower jacket 50 in a manner that allows the housing 76 to axially travel with the lower jacket 50 in operation. In the illustrated embodiment, the handwheel feedback actuator housing 76 is coupled to a forward end of the lower jacket 50.

The upper jacket 48 is axially adjustable relative to the lower jacket 50 over a first range of axial positions, which may be referred to as a "comfort range". The comfort range is a range of axial positions that are useful for manual driving during operation of the vehicle for different sized operators. The axial movement of the upper jacket 48 relative to the lower jacket 50 is done in a telescoping manner due to the movement of the upper jacket 48 within the lower jacket 50. The comfort range encompasses a range of axial positions which are useful for an operator during a manual driving mode of the vehicle. In other words, the steering input device 42 is accessible and able to be comfortably controlled over the first range of axial positions.

The second range of axial positions may be referred to as a "stowing range" of the steering column 45. The stowing range is a range of axial positions that moves the overall steering column assembly further away from the operator when compared to the comfort range (i.e., toward an instrument panel and firewall of the vehicle). In some embodiments, the fully retracted position is a stowed position that may be flush with an instrument panel, firewall or other vehicle structure. The stowing range of axial movement includes further telescope travel of the upper jacket 48 relative to the lower jacket, in combination with axial movement of the lower jacket 50 relative to the column mounting bracket 70. The movement of the lower jacket 50 relative to the column mounting bracket 70 is done in a translating manner due to the movement of the overall upper and lower jackets together adjacent to the column mounting bracket 70.

FIGS. 4A and 4B illustrate the steering column assembly 44 in two axial positions. In particular, FIG. 4A shows the steering column assembly 44 in a non-stowed position where the upper jacket 48 is extended within the first range of axial positions. FIG. 4B shows the steering column assembly 44 in a stowed position where the upper jacket 48 is positioned in a full telescope-in location relative to the lower jacket 50, and the lower jacket 50 is translated fully away from the operator relative to the column mounting bracket 70.

With continued reference to FIGS. 2 and 3, the steering column assembly 44 includes a first actuator 72 which may be referred to as a comfort/stow actuator. The first actuator 72 is operatively coupled to the upper jacket 48 to control the telescoping movement of the upper jacket 48 relative to the lower jacket 50 over the first range of axial positions. In the illustrated embodiment, the first actuator 72 is mounted to a specific portion of the steering column assembly 44, but other mounting locations are contemplated.

The steering column assembly 44 also includes a second actuator 74 which may be referred to as a stowing actuator. The second actuator 74 is operatively coupled to the lower jacket 50 to control the translating movement of the lower jacket 50 relative to the column mounting bracket 70 over the second range of axial positions. In the illustrated embodiment, the second actuator 74 is mounted to a specific portion of the steering column assembly 44, but other mounting locations are contemplated.

Both the first and second actuators are located proximate a forward location of the steering column assembly 44 to accommodate the axial movement during a stowing operation. The term "forward" refers to a position relative to the vehicle that the steering column assembly 44 is disposed within and distal relative to the input device 42. The two actuators 72, 74 are responsible for the full stow motion of the steering column 45, however only the first actuator 72 operates during comfort adjustment within the first range of axial adjustment positions. In other words, the first actuator 72 is solely responsible for axial adjustment over the first range, but the first actuator 72 and the second actuator 74 operate simultaneously during the stowing which occurs over the second range of travel. The first actuator 72 is affixed between the upper jacket 48 and the lower jacket 50, while the second actuator 74 is affixed between the column mounting bracket 70 and the lower jacket 50. In some embodiments, the actuators 72, 74 may each be fixed to the handwheel feedback actuator housing 76, which houses the emulator 46.

Each actuator 72, 74, may cause axial movement of the respective associated components it is operatively coupled to. By way of non-limiting example, the illustrated embodiment of each actuator 72, 74 includes an electric motor that has an output shaft coupled to a lead screw. The lead screw has a nut threaded thereto, such that rotation of the lead screw results in axial translation of the nut since the nut is rotatably constrained. The respective nut of each actuator 72, 74 is operatively coupled to a component that drives axial movement of the component during operation. In particular, the nut of the first actuator 72 results in axial movement of the upper jacket 48 relative to the lower jacket 50, while the nut of the second actuator 72 results in axial movement of the lower jacket 50 relative to the column mounting bracket 70.

Additionally, a rake actuator assembly 80 is mounted to the lower jacket 50, as shown well in FIG. 3. The rake actuator assembly 80 controls movement in a rake direction of the steering column assembly 44. The rake actuator assembly 80 includes a rake bracket 82 that is operatively coupled to the lower jacket 50 and adjusts the steering column 45 substantially vertically about a pivot axis located proximate a forward location of the steering column assembly 44.

As shown in FIGS. 2, 4A and 4B, the column mounting bracket 70 defines a first set of tapered rail slots 90. Referring to FIGS. 3, 4A and 4B, the lower jacket 50 defines a second set of tapered rail slots 92. The first set of tapered rail slots 90 extends longitudinally in an axial direction of the steering column 45 and includes a slot on each lateral side of the column mounting bracket 70. The second set of tapered rail slots 92 extends longitudinally in an axial direction of the steering column 45 and includes a slot on each lateral side of the lower jacket 50. The tapered slots of the first set of tapered rail slots 90 each tapers from a widest dimension at a laterally outward location of the column mounting bracket 70 to a narrower dimension at a laterally inward location of the column mounting bracket 70. The tapered slots of the second set of tapered rail slots 92 each tapers from a widest dimension at a laterally outward location of the lower jacket 50 to a narrower dimension at a laterally inward location of the lower jacket 50. The relative elevations of the first and second sets of tapered rail slots 90, 92 may vary.

Referring to FIGS. 2 and 3, the steering column assembly 44 is installed to the column mounting bracket 70 and coupled thereto with bolts and sliding wedge bushings. In particular, a first pair of sliding wedge bushings 94 is positioned within the first set of tapered rail slots 90, with one sliding wedge bushing on each side of the column mounting bracket 70. Each of the first pair of sliding wedge bushings 94 is coupled to the rake bracket 82 with a first set of bolts 96. The first pair of sliding wedge bushings 94 are positioned at an outward location of the column mounting bracket 70 and the bolts 96 extend through the first sliding wedge bushings 94 and into the rake bracket 82. The rake bracket 82 is coupled to the lower jacket 50 with one or more mechanical fasteners 93 on each side of the lower jacket 50.

Referring now to FIGS. 3, 4A and 4B, a second interface between the lower jacket 50 and the column mounting bracket 70 is provided with a second pair of sliding wedge bushings 98. The second pair of sliding wedge bushings is positioned within the second set of tapered rail slots 92, with one sliding wedge bushing on each side of the lower jacket 50. The second pair of sliding wedge bushings 98 are positioned at an outward location of the lower jacket 50 and coupled to the column mounting bracket 70 with a pair of bolts 100 extending through the column mounting bracket 70 and the second sliding wedge bushings 98. The tapered rail slots 90, 92 in the column mounting bracket 70 and the lower jacket 50 serve as a receiving interface for the sliding wedge bushings 94, 98 and provide guidance for the upper jacket 48 and the lower jacket 50 to translate relative to the column mounting bracket 70 during stow operation.

In some embodiments, the first and second sliding wedge bushings 94, 98 constrict around the bolts or nuts associated therewith when driven into the tapered rail slots 90, 92 on the column mounting bracket 70 and the lower jacket 50, respectively, thereby de-lashing the joints.

The embodiments disclosed herein provide a stowable steering column assembly 44 that moves the forward-most point of the footprint away from a firewall during normal driving operation, thereby creating additional space for vehicle energy absorption during a barrier event. The disclosed embodiment allow for long displacement deep-stow functionality, while minimizing footprint size compared to other column designs, such as triple jacket designs, for the same stow displacement.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. An axially adjustable steering column assembly comprising:
   an upper jacket;
   a lower jacket, wherein the upper jacket is received within the lower jacket and is telescopingly adjustable therein;
   a column mounting bracket, wherein the lower jacket is operatively coupled to the column mounting bracket and translates relative to the column mounting bracket;
   a first bushing disposed between the lower jacket and the column mounting bracket on a first side of the column mounting bracket;
   a second bushing disposed between the lower jacket and the column mounting bracket on a second side of the column mounting bracket;
   a first actuator operatively coupled to the upper jacket to control telescoping adjustment of the upper jacket relative to the lower jacket; and
   a second actuator operatively coupled to the lower jacket to control translating adjustment of the lower jacket relative to the column mounting bracket.

2. The axially adjustable steering column assembly of claim 1,
   wherein the first bushing and the second bushing are sliding wedge bushings.

3. The axially adjustable steering column assembly of claim 2, wherein the column mounting bracket defines a first set of tapered rail slots, each of the first set of tapered rail slots disposed on opposite sides of the column mounting bracket and extending longitudinally along the column mounting bracket, wherein the lower jacket defines a second set of tapered rail slots, each of the second set of tapered rail slots disposed on opposite sides of the lower jacket and extending longitudinally along the lower jacket, wherein the first wedge bushing and the second wedge bushing are each disposed within a respective one of the first set of tapered rail slots and the second set of tapered rail slots.

4. The axially adjustable steering column assembly of claim 1, further comprising:
   a first bolt extending through the first bushing and operatively couples the first bushing to the column mounting bracket; and
   a second bolt extending through the second bushing and operatively couples the second bushing to the column mounting bracket.

5. The axially adjustable steering column assembly of claim 4, wherein the second bushing is directly coupled to the column mounting bracket with the second bolt.

6. The axially adjustable steering column assembly of claim 1, further comprising a handwheel feedback actuator housing operatively coupled to the lower jacket, wherein the handwheel feedback actuator housing translates with the lower jacket relative to the column mounting bracket.

7. The axially adjustable steering column assembly of claim 6, wherein the handwheel feedback actuator housing is operatively coupled to the lower jacket at a forward location of the lower jacket.

8. The axially adjustable steering column assembly of claim 7, further comprising a rake bracket operatively coupled to the lower jacket, wherein the first bushing is secured to the rake bracket with the first bolts.

9. The axially adjustable steering column assembly of claim 8, wherein the rake bracket includes a pair of legs, wherein each of the legs are positioned laterally inwardly of the first bushing.

10. The axially adjustable steering column assembly of claim 8, wherein the second bushing is located axially forward of the first bushing.

11. The axially adjustable steering column assembly of claim 1, wherein the first actuator controls movement of the steering column assembly over a first range of axial adjustment, wherein the first actuator and the second actuator operate simultaneously to control movement of the steering column assembly over a second range of axial adjustment, wherein the second range of axial adjustment is a stow range of the steering column assembly.

* * * * *